(12) United States Patent
Kim (10) Patent No.: US 12,130,149 B2
(45) Date of Patent: Oct. 29, 2024

(54) NAVIGATION SYSTEM AND ROUTE SEARCH METHOD THEREOF

(71) Applicants: Hyundai Motor Company, Seoul (KR); Kia Corporation, Seoul (KR)

(72) Inventor: Chi Hwan Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/367,236

(22) Filed: Sep. 12, 2023

(65) Prior Publication Data

US 2023/0417566 A1 Dec. 28, 2023

Related U.S. Application Data

(62) Division of application No. 16/515,471, filed on Jul. 18, 2019, now Pat. No. 11,788,853.

(30) Foreign Application Priority Data

Mar. 20, 2019 (KR) ........................ 10-2019-0031741

(51) Int. Cl.
*G01C 21/34* (2006.01)
*G08G 1/00* (2006.01)
*G08G 1/0968* (2006.01)

(52) U.S. Cl.
CPC ....... *G01C 21/3492* (2013.01); *G08G 1/0968* (2013.01); *G08G 1/202* (2013.01)

(58) Field of Classification Search
CPC ............ G01C 21/3492; G01C 21/3438; G01C 21/3453; G01C 21/3415; G01C 21/3694;
(Continued)

(56) References Cited

U.S. PATENT DOCUMENTS 9,188,985 B1 * 11/2015 Hobbs ................ G01C 21/3626
9,940,840 B1 * 4/2018 Schubert ................ G06Q 30/06
(Continued)

FOREIGN PATENT DOCUMENTS

CN 106643773 A 5/2017
CN 106843210 A 6/2017
(Continued)

OTHER PUBLICATIONS

Notification of First Office Action for Chinese Patent Application No. 2023102700921440 from China National Intellectual Property Administration, dated Oct. 27, 2023, 23 pages, with English translation.

(Continued)

*Primary Examiner* — Thomas Ingram
(74) *Attorney, Agent, or Firm* — Fox Rothschild LLP (57) ABSTRACT

A navigation system and a route search method thereof are provided. The navigation system includes a vehicle controller that performs platoon driving and a service server. The service server includes a communicator that communicates with the vehicle and receives traffic information, a database that stores platoon driving information received from the communicator, and a processor that generates a driving route based on the traffic information and the platoon driving information according to a route search request from the vehicle.

4 Claims, 6 Drawing Sheets

(58) Field of Classification Search
CPC .............. G01C 21/362; G01C 21/3664; G01C 21/3691; G01C 21/3697; G08G 1/0968; G08G 1/202; G08G 1/096775; G08G 1/096811; G08G 1/096833; G08G 1/22; G06Q 10/047

See application file for complete search history.

(56) References Cited

U.S. PATENT DOCUMENTS

| | | | |
|---|---|---|---|
| 10,414,356 B2 | 9/2019 | Kim | |
| 11,232,711 B2* | 1/2022 | Lacaze | G05D 1/0248 |
| 11,332,142 B2* | 5/2022 | Jornod | G08G 1/22 |
| 11,636,405 B2* | 4/2023 | Atanasiu | G06Q 10/047 |
| | | | 701/533 |
| 11,900,816 B2* | 2/2024 | Hsu | G05D 1/0223 |
| 2010/0256852 A1* | 10/2010 | Mudalige | G08G 1/164 |
| | | | 701/24 |
| 2014/0316865 A1* | 10/2014 | Okamoto | G05D 1/0293 |
| | | | 705/14.1 |
| 2017/0293296 A1* | 10/2017 | Stenneth | G06Q 10/06315 |
| 2017/0344023 A1 | 11/2017 | Laubinger et al. | |
| 2018/0059687 A1* | 3/2018 | Hayes | G08G 1/096816 |
| 2018/0154895 A1* | 6/2018 | Chae | B60W 10/04 |
| 2018/0170289 A1 | 6/2018 | Kim | |
| 2018/0341277 A1* | 11/2018 | Yang | G05D 1/0293 |
| 2019/0015976 A1* | 1/2019 | Sweeney | G01C 21/3676 |
| 2019/0096265 A1* | 3/2019 | Mok | G08G 1/163 |
| 2019/0171227 A1* | 6/2019 | Sujan | G05D 1/0295 |
| 2019/0236959 A1* | 8/2019 | Belapurkar | G08G 1/22 |
| 2019/0286120 A1* | 9/2019 | Stenneth | G05D 1/0297 |
| 2019/0301877 A1* | 10/2019 | Duale | G01C 21/3484 |
| 2019/0349719 A1* | 11/2019 | Pattan | H04W 4/08 |
| 2020/0027355 A1* | 1/2020 | Sujan | B60W 30/16 |
| 2020/0201674 A1* | 6/2020 | McSchooler | G06F 9/4887 |
| 2020/0249699 A1* | 8/2020 | Kim | G05D 1/0295 |
| 2020/0264634 A1* | 8/2020 | Hadi | B60W 60/0023 |
| 2020/0265721 A1* | 8/2020 | Haugh | G06Q 10/06315 |
| 2020/0300649 A1* | 9/2020 | Kim | G08G 1/0968 |
| 2020/0312152 A1* | 10/2020 | Lacaze | G05D 1/0255 |
| 2021/0148716 A1* | 5/2021 | Atanasiu | G06Q 10/047 |
| 2021/0182997 A1* | 6/2021 | Klingemann | G06Q 10/06315 |
| 2022/0169401 A1* | 6/2022 | Di Cosola | B60L 53/12 |
| 2022/0170753 A1* | 6/2022 | Verma | G01C 21/3626 |

FOREIGN PATENT DOCUMENTS

| | | | |
|---|---|---|---|
| CN | 108011947 A | | 5/2018 |
| CN | 108216079 A | | 6/2018 |
| CN | 108764516 A | | 11/2018 |
| KR | 10-2018-0062810 A | | 6/2018 |
| WO | 2018035145 A1 | | 2/2018 |

OTHER PUBLICATIONS

Notice of Allowance for Chinese Patent Application No. 2019107021482 by China National Intellectual Property Administration, mailed Jul. 1, 2024, English translation, 7 pages.

Li, J. et al., "Association rules mining of vehicle routing for personalized traffic information service", Systems Engineering—Theory & Practice, vol. 33, No. 12, Dec. 2013, 7 pages.

Zhang, K., et al., "Research on Route Planning System for Vehicle Automatic Navigation", Systems Engineering, vol. 19, No. 2, Mar. 2001, 7 pages.

Zhang, X., et al., "Implementation of Smartphone Seamless Positioning System based on Mobile Navigation Electronic Map", IEEE UPINLBS'2016, Nov. 3-4, 2016, Shanghai, P.R. China, 5 pages.

* cited by examiner

NAVIGATION SYSTEM AND ROUTE SEARCH METHOD THEREOF

CROSS-REFERENCES TO RELATED APPLICATIONS

This Application is a Division of application Ser. No. 16/515,471 filed on Jul. 18, 2019. Application Ser. No. 16/515,471 claims the benefit of Korean Patent Application No. 10-2019-0031741 filed on Mar. 20, 2019 in the Korean Intellectual Property Office (KIPO), the entire contents of each of which are incorporated herein by reference.

TECHNICAL FIELD

The present disclosure relates to a navigation system and a route search method thereof, and more particularly, to a navigation system and route search method that search for an optimal driving route for an individual driver and platoon based on real-time traffic information.

BACKGROUND

A navigation system identifies a current position of a vehicle and searches for an optimal route toward a destination based on map data previously stored in a memory. The navigation system also calculates the optimal route to the destination based on real-time traffic information collected via a communication network. Conventionally, the optimal route is calculated based on a shortest distance, a minimum time, and/or a minimum cost in route search, but a new route search method is needed when autonomous driving vehicles are generalized and platooning is commercialized.

SUMMARY

The present disclosure provides a navigation system and a route search method which search for an optimal driving route in which individual driving and platoon driving are possible in consideration of real-time traffic situations and platoon driving information. The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a navigation system may include a controller configured to perform platoon driving and a service server. The service server may include a communicator configured to communicate with a subject vehicle in which the navigation system is housed and configured to receive traffic information, a database configured to store platoon driving information received from the communicator, and a processor configured to generate a driving route based on the traffic information and the platoon driving information according to a route search request from the vehicle. The platoon driving information may include information regarding a platoon driving global route, a position of a grouping vehicle, and an autonomous driving level.

The processor may be configured to generate an individual driving route based on the traffic information according to the route search request, search for the platoon driving global route which at least partially matches the individual driving route, and calculate and provide a platoon joining position and a platoon joining time to the vehicle (e.g., the controller). The processor may further be configured to generate a driving route in which individual driving and platoon driving are possible by mixing the individual driving route, and the platoon driving global route based on a determination of whether to join a platoon.

Additionally, the processor may be configured to generate a driving route of lowest cost using a cost function considering at least one of fatigue, a manual driving time and a schedule of a driver, whether it is possible for the vehicle to join a platoon, an autonomous driving level of a grouping vehicle, a waiting time for joining the platoon, an individual driving distance after platoon driving, a platoon driving hold time, and a platoon exiting time. The processor may be configured to calculate a platoon joining position and a platoon joining time at which it is possible to participate in platoon driving based on a current position of the vehicle, in response to a request for determination of whether it is possible to join a platoon from the vehicle.

According to an aspect of the present disclosure, a vehicle terminal apparatus may include a communicator configured to communicate with a service server and a grouping vehicle, a vehicle control device configured to control a behavior of a vehicle, and a processor configured to receive a driving route in which individual driving and platoon driving are possible by requesting route search from the service server. The processor may instruct the vehicle control device to control following driving when the vehicle arrives at a platoon driving section along the driving route.

Additionally, the processor may be configured to determine whether to suggest platoon driving to the driver based on at least one of fatigue, a manual driving time and a schedule of the driver using sensors during driving of the vehicle. The processor may then be configured to request the service server to determine whether it is possible to join a platoon based on a current position of the vehicle in response to determining to suggest the platoon driving. The vehicle terminal apparatus may further include a user input device configured to receive a user input. The processor may be configured to stop the platoon driving and perform route guidance for the individual driving when receiving a platoon exit command from the user input device during the platoon driving.

According to an aspect of the present disclosure, a route search method of a navigation system may include receiving, by a service server, a route search request from a vehicle, and generating, by the service server, a driving route based on traffic information and platoon driving information according to the route search request. The generating of the driving route may include generating, by the service server, a driving route of a lowest cost using a cost function considering at least one of fatigue, a manual driving time and a schedule of a driver, whether it is possible for the vehicle to join a platoon, an autonomous driving level of a grouping vehicle, a waiting time for joining the platoon, an individual driving distance after platoon driving, a platoon driving hold time, and a platoon exiting time.

The generating of the driving route may include generating, by the service server, an individual driving route of the vehicle based on the traffic information, and searching for, by the service server, a platoon driving global route which at least partially matches the individual driving route, and generating, by the service server, a driving route that includes platoon joining information by mixing or combining the individual driving route and the platoon driving global route.

The route search method may further include after searching for the platoon driving global route, calculating, by the service server, a platoon joining position and a platoon joining time based on the platoon driving global route, and transmitting the platoon joining position and time to the vehicle, determining, by the vehicle, whether to join a platoon based on a driver's intention to participate in platoon driving based on the platoon joining position and time, and requesting, by the vehicle, platoon joining from the service server when it is determined to join the platoon.

The route search method may further include, after generating the driving route including the platoon joining information, transmitting, by the service server, the driving route including the platoon joining information to the vehicle, moving, by the vehicle, to a platoon joining position based on the platoon joining information, and joining, by the vehicle, a designated platoon at the platoon joining position and performing platoon driving. The route search method may further include, after performing the platoon driving, stopping, by the vehicle, the platoon driving, and performing route guidance for individual driving when a platoon exit command is received from a driver.

Additionally, the route search method may include, after searching for the platoon driving global route, transmitting, by the service server, the individual driving route when the platoon driving global route is not found, performing, by the vehicle, route guidance based on the individual driving route, determining, by the vehicle, whether to join a platoon based on driver information during driving of the vehicle according to the route guidance, and requesting, by the vehicle, platoon joining from the service server when it is determined to join the platoon.

The determining of whether to join the platoon based on the driver information may include determining, by the vehicle, whether to suggest platoon driving to a driver based on at least one of fatigue, a manual driving time and a schedule of the driver, requesting, by the vehicle, the service server to determine whether it is possible to join the platoon in response to determining to join the platoon, calculating, by the service server, a platoon joining position and a platoon joining time at which the vehicle is able to participate in platoon driving based on a current position of the vehicle and transmitting the platoon joining position and time to the vehicle, and determining, by the vehicle, whether to join the platoon based on a driver's intention to participate in platoon driving based on the platoon joining position and time.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The controller may be specifically programmed to executed the method described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of wellknown features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure relates to a technology for generating an optimal route in which individual driving and platoon driving (platooning) are mixed or combined using a cost function considering traffic information, a driver's fatigue degree or schedule to be processed during driving of the vehicle, or the like when searching for (generating) a route. In the disclosure, the individual driving may refer to a vehicle that is being driven alone (e.g., without being in a platoon). In this case, behavior of the vehicle may be adjusted by a driver (e.g., manual driving) or by an electronic control device (e.g., controller) mounted within the vehicle (e.g., autonomous driving). The platoon driving refers to one leading vehicle LV and one or more following vehicles FV forming a platoon or group and preforming platoon driving. In the present disclosure, the leading vehicle LV may be a most front vehicle in a row of vehicles which perform platoon driving, the following vehicle FV may be a vehicle following the leading vehicle LV and a preceding vehicle is a vehicle ahead of a vehicle (host or subject vehicle). The leading vehicle LV and the following vehicles FV may be collectively referred to as grouping vehicles (GV).

Figure 1:
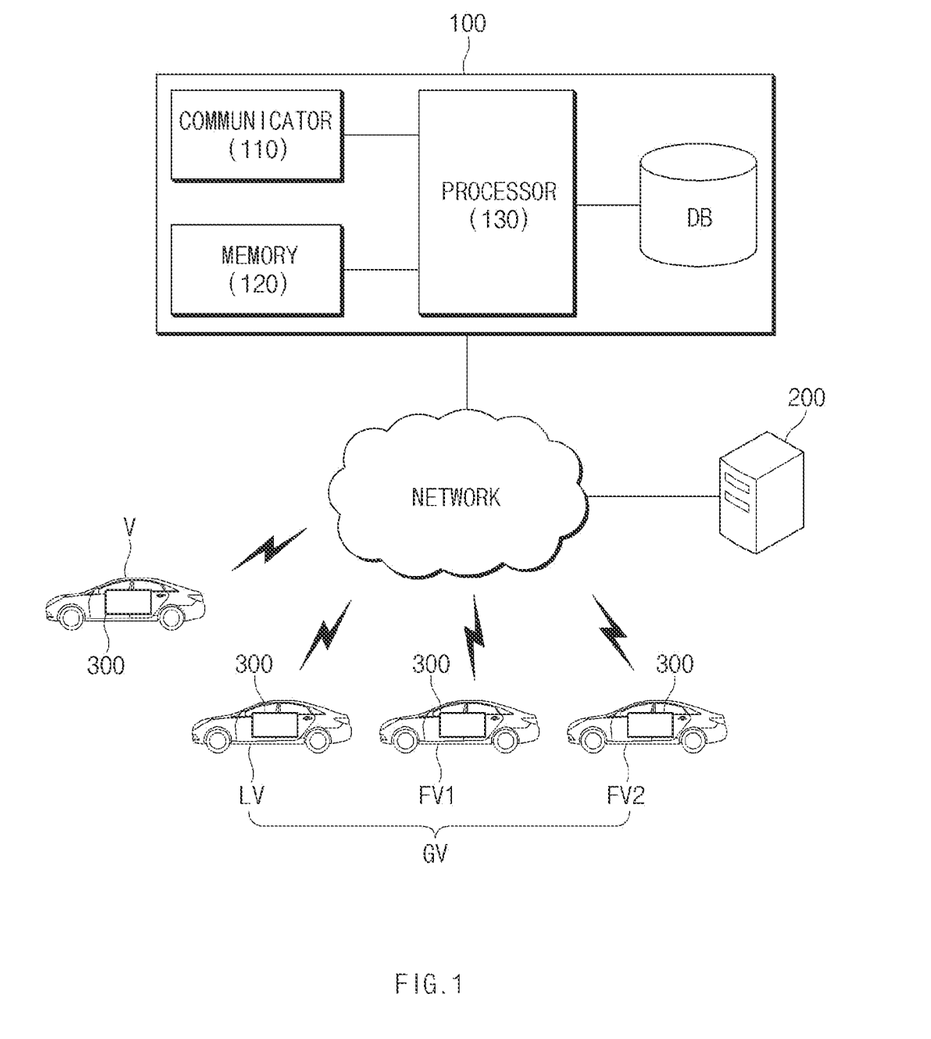
FIG. 1 is a configuration diagram illustrating a navigation system according to an exemplary embodiment of the present disclosure.
Figure 2:
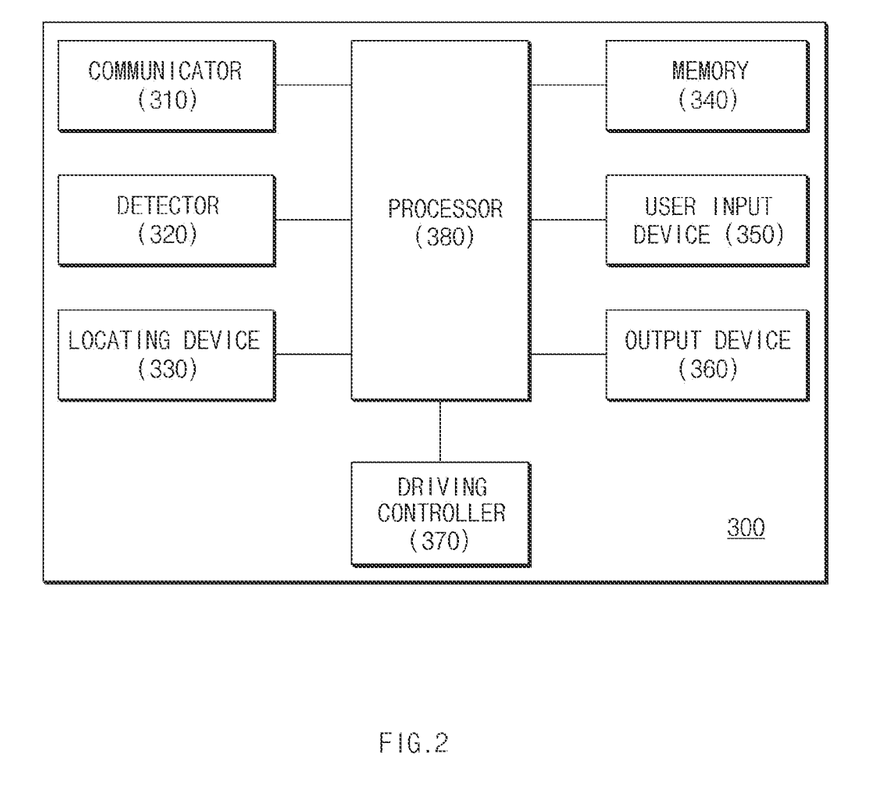
FIG. 2 is a block diagram illustrating a vehicle terminal apparatus illustrated in FIG. 1 according to an exemplary embodiment of the present disclosure.

FIG. 1 is a configuration diagram illustrating a navigation system according to an exemplary embodiment of the present disclosure and FIG. 2 is a block diagram illustrating a vehicle terminal apparatus illustrated in FIG. 1. Referring to FIG. 1, a navigation system may include a service server 100, a traffic information provision system 200, and a vehicle terminal apparatus 300 mounted on each of a vehicle "V" and grouped vehicles GV, which are connected via a communication network.

The service server 100 may be configured to manage information related to platoon driving of the grouped vehicles GV, that is, platoon driving information, and search for and provide an optimal driving route based on the platoon driving information at a request of the vehicle "V". The service server 100 may include a communicator 110, a memory 120, a processor 130 and database DB.

Particularly, the communicator 110 may be configured to perform wired and/or wireless communication with the vehicles "V" and GV, a roadside apparatus and/or the traffic information provision system 200. As wired communication technology, a LAN (Local Area Network), a WAN (Wide Area Network), an Ethernet and/or an Integrated Services Digital Network (ISDN) may be used, and as wireless communication technology, Vehicle to Everything (V2X), wireless Internet, and/or mobile communication may be used.

In the disclosure, as the V2X technology, Vehicle to Vehicle (V2V), Vehicle to Infrastructure (V2I), Vehicle-to-Nomadic Devices (V2N), and/or In-Vehicle Network (IVN), or the like may be applied. As wireless Internet technology, telematics, wireless LAN (WLAN) (WiFi), Wibro (wireless broadband), and Wimax (World Interoperability for Microwave Access) may be used. As mobile communication technology, Code Division Multiple Access (CDMA), Global System for Mobile communication (GSM), Long Term Evolution (LTE) and International Mobile Telecommunication (IMT)-2020 may be used.

The communicator 110 may be configured to receive traffic information transmitted from the traffic information provision system 200. The traffic information provision system 200 may provide traffic information (e.g., traffic situation information for each road section, road information and/or climate information, or the like) and may be implemented with an Intelligent Transportation System (ITS).

The memory 120 may be configured to store a program for operation of the processor 130, and temporarily store input/output data. The memory 120 may be implemented with at least one storage medium (recording medium) of storage media such as a flash memory, a hard disk, an SD card (Secure Digital Card), a Random Access Memory (RAM), a Static Random Access Memory (SRAM), a Read Only Memory (ROM), a Programmable Read Only Memory (PROM), an Electrically Erasable and Programmable ROM (EEPROM), an Erasable and Programmable ROM (EPROM), a register, a removable disk and a web storage.

Further, the memory 120 may be configured to store map information (e.g., precision map), various setting information, and the like. In addition, the memory 120 may be configured to store traffic information (e.g., traffic situation information) and location information of the vehicle "V", which are received via the communicator 110. The memory 120 may be configured to store a route search (generation) algorithm. The processor 130 may be configured to execute overall operation of the service server 100. The processor 130 may be implemented with at least one of an application specific integrated circuit (ASIC), a digital signal processor (DSP), a programmable logic device (PLD), field programmable gate array (FPGAs), a central processing unit (CPU), microcontrollers, and microprocessors.

The database DB may be configured to store and manage platoon driving information. The platoon driving information may include leading vehicle identification information, following vehicle identification information, position information of a vehicle in a row of vehicles in a platoon, a platoon driving global route, positions of the grouping vehicles (e.g., the leading vehicle and the following vehicles), an autonomous driving level, platoon joining and leaving information (e.g., joining-vehicle identification information, a joining position and time, leaving-vehicle identification information, and/or a leaving position and time, etc.). The processor 130 may be configured to collect current location (current position) information of the grouping vehicles GV via the communicator 110 at preset periods (e.g., about five minutes), and store and manage the information in the database DB. The processor 130 may be configured to collect the current location information of the grouping vehicles GV in real time. The autonomous driving level means levels of driving automation defined by Society of Automotive Engineers (SAE) international.

The processor 130 may be configured to generate an individual driving route using map information and traffic information stored in the memory 120 in response to a route search request transmitted from the vehicle "V" via the communicator 110. The vehicle "V" may then be configured to transmit a current location of the vehicle "V" and destination information together at the route search request. Additionally, the vehicle "V" may be configured to additionally transmit a desired destination arrival time at the route search request. The processor 130 may be configured to generate an individual driving route(s) for arriving at a destination from a current location of the vehicle "V" based on the traffic information based on the map information.

The processor 130 may be configured to search the database DB for a platoon driving global route that at least partially matches the individual driving route. The processor 130 may then be configured to extract a section route in which the individual driving route and the platoon driving global route match each other. The processor 130 may be configured to calculate a platoon joining position and time information, and a platoon exit position and time information based on the individual driving route and the platoon driving global route. The processor 130 may be configured to determine, as the platoon joining position, a position at which the individual driving route meets the platoon driving global route (e.g., a start position of the section route in which the individual driving route matches the platoon driving global route). On the other hand, the processor 130 may be configured to determine, as the platoon leaving position, an end position of the section route in which the individual driving route matches the platoon driving global route, that is, a position at which the individual driving route is separated from the platoon driving global route.

The processor 130 may be configured to generate a driving route of the vehicle "V" based on the detected platoon driving global route. In other words, the driving route may include a section route in which the vehicle "V" drives individually (e.g., individual driving route) and a section route (e.g., a section route for platoon driving) in which the vehicle "V" joins a preset specific platoon and performs autonomous driving for platooning by following the leading vehicle LV in the corresponding platoon.

As described above, the processor 130 may be configured to generate a driving route (e.g., an optimal route) in which individual driving and platoon driving both are possible, based on traffic information and platoon driving information. On the other hand, when generating the driving route, the processor 130 may be configured to generate a driving route of a lowest cost using a cost function considering the health, fitness status, fatigue and manual driving time of a driver, a schedule to be processed during driving of the vehicle, an autonomous driving level of a grouping vehicle, whether it is possible to join a platoon, a waiting time for joining a platoon, a platoon exit time, an individual driving distance after platoon autonomous driving and/or a platoon driving hold time.

In order words, the processor 130 may be configured to generate a driving route of a lowest cost based on least one of the health, fitness status, fatigue and manual driving time of a driver, a schedule to be processed during driving of the vehicle, an autonomous driving level of a grouping vehicle, whether it is possible to join a platoon (e.g., due to detection of a nearby platoon), a waiting time for joining a platoon, a platoon leaving time, an individual driving distance after platoon autonomous driving and a platoon driving hold time. The health, fitness status, and fatigue of a driver may be determined using biometric information gathered by a sensor. The schedule to be processed may be input ahead of time by a driver and stored in the database. The processor 130 may be configured to transmit a platoon joining position and time information to the vehicle "V" when a platoon driving global route is detected of which at least a part matches the individual driving route. In other words, the processor 130 may be configured to output a notification to the vehicle "V" regarding the existence of a section of the individual driving route, in which the vehicle "V" is able to participate in platoon driving when the section detected.

Thereafter, when the processor 130 receives an intention (e.g., decision of participation or user) to participate in platoon driving from the vehicle "V", the processor 130 may be configured to transmit a driving route including platoon joining information or platoon joining and exit information to the vehicle "V". In particular, the processor 130 may be configured to transmit the platoon joining information or the platoon joining and exit information to the grouping vehicles GV. The processor 130 may be configured to transmit an individual driving route when the vehicle "V" does not intend to participate in the platoon driving. The vehicle "V" may be configured to perform route guidance according to the individual driving route or perform autonomous driving according to the individual driving route.

In response to receiving a request for determination of whether it is possible to join a platoon from the vehicle "V" which is driving along the individual driving route, the processor 130 may be configured to search for a platoon which the vehicle "V" is able to join based on a current position of the vehicle "V". Particularly, the processor 130 may be configured to search for a platoon driving global route which at least partially matches the individual driving route set in the vehicle "V". The processor 130 may then be configured to calculate a platoon joining position and a platoon joining time based on the individual driving route set in the vehicle "V" and the detected platoon driving global route. The processor 130 may be configured to transmit information regarding the platoon joining position and time to the vehicle "V".

Thereafter, the processor 130 may be configured to generate a driving route including platoon joining information and transmit the driving route to the vehicle "V" depending on determination of whether to join a platoon based on the information on the platoon joining position and time of the vehicle "V". In particular, the processor 130 may be configured to transmit the platoon joining information to the grouping vehicles GV. In response to receiving the driving route including the platoon joining information, the vehicle "V" may move to the platoon joining position, join a preset (predetermined) platoon and perform platoon autonomous driving (platoon driving) along with the grouping vehicle GV. In particular, a controller within the vehicle "V" may be configured to operate the vehicle to execute the above described processes.

Moreover, referring to FIG. 2, the vehicle terminal apparatus 300 may include a communicator 310, a detector 320, a positioning device 330, a memory 340, a user input device 350, an output device 360, a driving controller 370, and a processor 380. In this specification, to facilitate understanding of the description, a case where the vehicle terminal apparatus 300 is mounted on the vehicle "V" requesting the route search from the service server 100 will be mainly described.

The communicator 310 may be configured to perform wired and/or wireless communication. A Local Area Networks (LAN), a Wide Area Network (WAN), Ethernet and/or an Integrated Services Digital Network (ISDN) may be used as wired communication technology, and Vehicle-to-everything (V2X), wireless Internet and/or mobile communication may be used as wireless communication technology.

Further, the detector 320 (e.g., sensor unit) may be configured to obtain surroundings information (e.g., environment information) and/or vehicle information of the vehicle "V" using various sensors and/or an electronic control unit (ECU) mounted within the vehicle "V". The sensors may include a camera (e.g., image sensor), a radar (Radio Detecting And Ranging), a LiDAR (Light Detection And Ranging), an ultrasonic sensor, and the like. In addition, the sensors may include an impact sensor, a speed sensor, a steering angle sensor, an acceleration sensor, and the like.

The detector 320 may be configured to obtain vehicle information (e.g., vehicle speed and vehicle running time) from various electronic control units (ECUs) connected via the IVN. The IVN may be implemented with, for example, a Controller Area Network (CAN), a Media Oriented Systems Transport (MOST) network, a Local Interconnect Network (LN), and/or an X-by-Wire (Flexray). In addition, the detector 320 may be configured to obtain driver information such as the fatigue, health and fitness status and/or manual driving time of the driver using a driver monitoring device and a biometric signal measuring device or sensor. The positioning device 330 may be configured to measure a current position (current location) of the vehicle "V". The positioning device 330 may specifically be configured to measure a position of the vehicle using at least one of positioning techniques such as Global Positioning System (GPS), Dead Reckoning (DR), Differential GPS (DGPS), and Carrier Phase Differential GPS (CDGPS).

The memory 340 may be configured to store software programmed to cause the processor 380 to execute predetermined operation, and store input/output data. The memory 340 may be implemented with at least one storage medium (recording medium) of storage media such as a flash memory, a hard disk, an SD card (Secure Digital Card), a Random Access Memory (RAM), a Static Random Access Memory (SRAM), a Read Only Memory (ROM), a Programmable Read Only Memory (PROM), an Electrically Erasable and Programmable ROM (EEPROM), an Erasable and Programmable ROM (EPROM), a register, a removable disk and a web storage.

Particularly, the memory 340 may be configured to store map information (e.g., precision map). The map information may be automatically updated at predetermined intervals or manually updated by the user. The memory 340 may be configured to store vehicle identification information and the maximum autonomous driving level (e.g., autonomous driving support level) which the vehicle "V" is able to support. The memory 340 may also be configured to store software programmed to perform following driving and/or autonomous driving of the vehicle "V". The user input device 350 may be configured to generate input data based on a user operation (e.g., participation or non-participation in platoon driving, platoon joining or platoon leaving, or the like). The user input device 350 may be implemented with, for example, a keyboard, a keypad, a button, a switch, a touch pad, and/or a touch screen.

The output device 360 may be configured to output a progress status and a result of operation of the vehicle terminal apparatus 300 through visual information, audible information, and/or tactile information, and may include a display, a sound output module, a tactile feedback output module, and the like. The display may include at least one of a liquid crystal display (LCD), a thin film transistor liquid crystal display (TFT LCD), an organic light-emitting diode (OLED) display, a flexible display, a three-dimensional (3D) display, a transparent display, a head-up display (HUD), a touch screen, and a cluster. In particular, the sound output module may be configured to output audio data stored in the memory 340. The sound output module may include a receiver, a speaker, and/or a buzzer. The tactile feedback output module may be configured to output a signal in a form that the user is able to perceive with a tactile sense. For example, the tactile feedback output module may be implemented with a vibrator to adjust a vibration intensity, a vibration pattern, and the like.

Further, the driving controller 370 may be configured to adjust and execute acceleration/deceleration, braking, shifting, and/or steering of the vehicle "V" by operating a power source control device (e.g., an engine control device) configured to operate a power source (e.g., an engine and/or a drive motor) of the vehicle, a braking control device, a steering control device and/or a shift control device. The power source control device may be configured to adjust the output of the power source based on position information of an accelerator pedal or a driving speed requested from the processor 380 (e.g., engagement amount of pedal). The braking control device may be configured to adjust a braking pressure based on a position of a brake pedal or an instruction from the processor 380 (e.g., engagement amount of pedal). The shift control device may be configured to execute the shifting of the vehicle "V" and may be implemented with an electronic shifter or an electric shifter (Shift By Wire, SBW). The steering control device may be configured to adjust the steering of the vehicle "V" and may be implemented with Motor Drive Power Steering (MDPS).

The processor 380 may be configured to execute overall operation of the vehicle "V", and may be implemented with at least one of an application specific integrated circuit (ASIC), a digital signal processor (DSP), a programmable logic device (PLD), field programmable gate array (FPGAs), a central processing unit (CPU), microcontrollers, and microprocessors. The processor 380 may be configured to request route search from the service server 100, and receive a driving route from the service server 100. The processor 380 may then be configured to perform route guidance by mapping the driving route received from the service server 100 to the map information. In particular, the processor 380 may be configured to output map information onto which the driving route is mapped to a display.

The processor 380 may be configured to transmit a current position of the vehicle "V" measured by the positioning device 330 and preset destination information when the route search is requested. In particular, the processor 380 may be configured to additionally transmit a desired destination arrival time to the service server 100. After the route search is requested, the processor 380 may be configured to receive information regarding the platoon joining position and time transmitted from the service server 100 via the communicator 310. Accordingly, the processor 380 may be configured to map and display the platoon joining position onto the map information and display a pop-up window to inquire about a user intention to participate in platoon driving on a display screen.

The processor 380 may be configured to determine whether to participate in platoon driving based on a user input received through the user input device 350. When the user intends to participate in platoon driving (e.g., when a user selection is received for participation in the platoon), the processor 380 may be configured to transmit the platoon joining request information to the service server 100. In response to receiving driving route information including the platoon joining information from the service server 100, the processor 380 may be configured to perform route guidance to the platoon joining position based on the platoon joining information. The driver may operate the vehicle "V"

based on the route guidance and move or guide the vehicle "V" to the platoon joining position.

When the vehicle "V" arrives at or reaches the platoon joining position, the processor 380 may be configured to determine whether grouping vehicles GV in a designated platoon arrive at the platoon joining position. In particular, the processor 380 may be configured to determine whether the grouping vehicles GV arrive at the platoon joining position by communication with the service server 100 and/or a leading vehicle LV in the platoon. The processor 380 may be configured to wait (e.g. remaining in a standby state) when the grouping vehicles GV do not arrive at the platoon joining position. When the grouping vehicles GV arrive at the platoon joining position, the processor 380 may join the designated platoon based on a predetermined procedure and perform platoon driving. In other words, the processor 380 may join the platoon using communication with the grouping vehicles GV in the designated platoon and may be configured to operate the vehicle to follow the leading vehicle of the platoon to perform autonomous driving.

When the user intends not to participate in platoon driving, the processor 380 may be configured to transmit information for notifying a non-joining state to a platoon to the service server 100. Thereafter, the processor 380 may be configured to receive an individual driving route from the service server 100 and perform route guidance. The processor 380 may be configured to collect driver information using the detector 320 while the vehicle "V" performs individual driving. In the disclosure, the driver information may include at least one of the driver's fatigue degree, manual driving time, and schedule. The processor 380 may be configured to determine whether to suggest participation in platoon driving based on the driver information. For example, the processor 380 may be configured to determine the suggestion for participation in platoon driving when the driver's fatigue degree is out of a reference range or the manual driving time exceeds a reference time.

The vehicle "V" may be configured to request the service server 100 to determine whether it is possible to join a platoon when the suggestion for participation in platoon driving is determined. In particular, the processor 380 may be configured to transmit current position information of the vehicle "V" measured by the positioning device 330 to the service server 100. In response to receiving a result of the determination of whether it is possible to join a platoon from the service server 100, the processor 380 may be configured to output the result of the determination to the driver in a form which the driver is able to perceive. When it is possible to join a platoon, the processor 380 may be configured to display the information regarding a platoon joining position and a platoon joining time on a display and determine whether to join the platoon based on a user input.

In response to determining to join the platoon, the processor 380 may be configured to request platoon joining from the service server 100 and receive a driving route including platoon joining information. Thereafter, the processor 380 may be configured to execute route guidance to the platoon joining position, and when the vehicle "V" arrives at the platoon joining position, join a designated platoon and perform platoon driving. In response to determining not to join the platoon, the processor 380 may be configured to maintain the route guidance according to the individual driving route. In other words, when individual driving is determined, the processor 380 may be configured to execute perform the route guidance using the individual driving route as a driving route.

In response to receiving a platoon exit command from the user input device 350 during platoon driving, the processor 380 may be configured to request platoon exit from the service server 100 and/or the grouping vehicles GV. Thereafter, when the vehicle "V" arrives at a platoon exit position after the platoon exit is requested, the processor 380 may be configured to stop the platoon driving and perform the individual driving. Further, the vehicle terminal apparatus 300 mounted within the grouping vehicles GV may be configured to measure a current vehicle position at predetermined intervals, and transmit the position to the service server 100. In addition, the vehicle terminal apparatuses 300 mounted within following vehicles FV1 and FV2 may follow the preceding vehicle PV based on an instruction from the leading vehicle LV and allow the vehicle to perform autonomous driving.

Figure 3A:
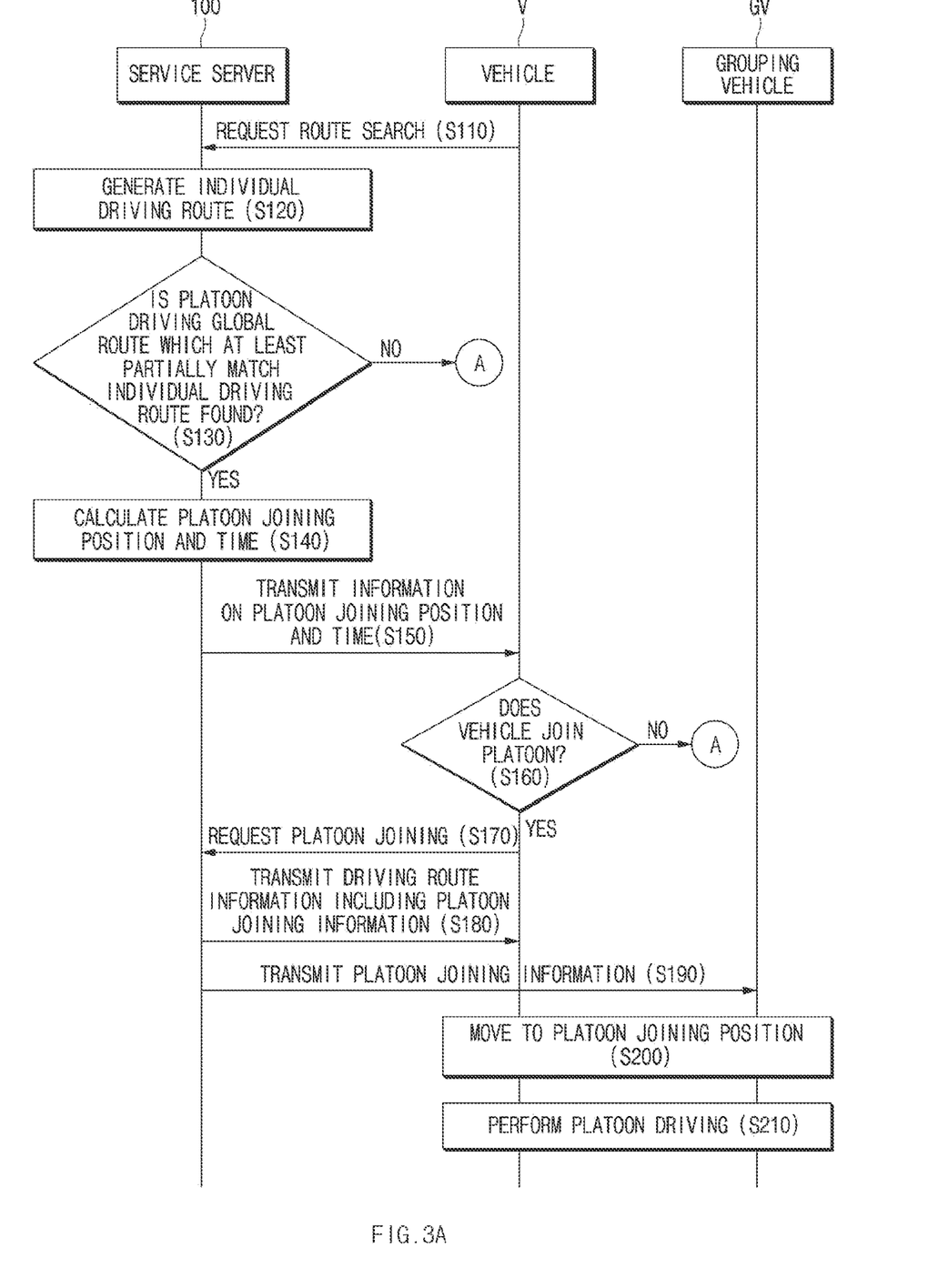
FIGS. 3A and 3B are flowcharts of a route search method of a navigation system according to an exemplary embodiment of the present disclosure.
Figure 3B:
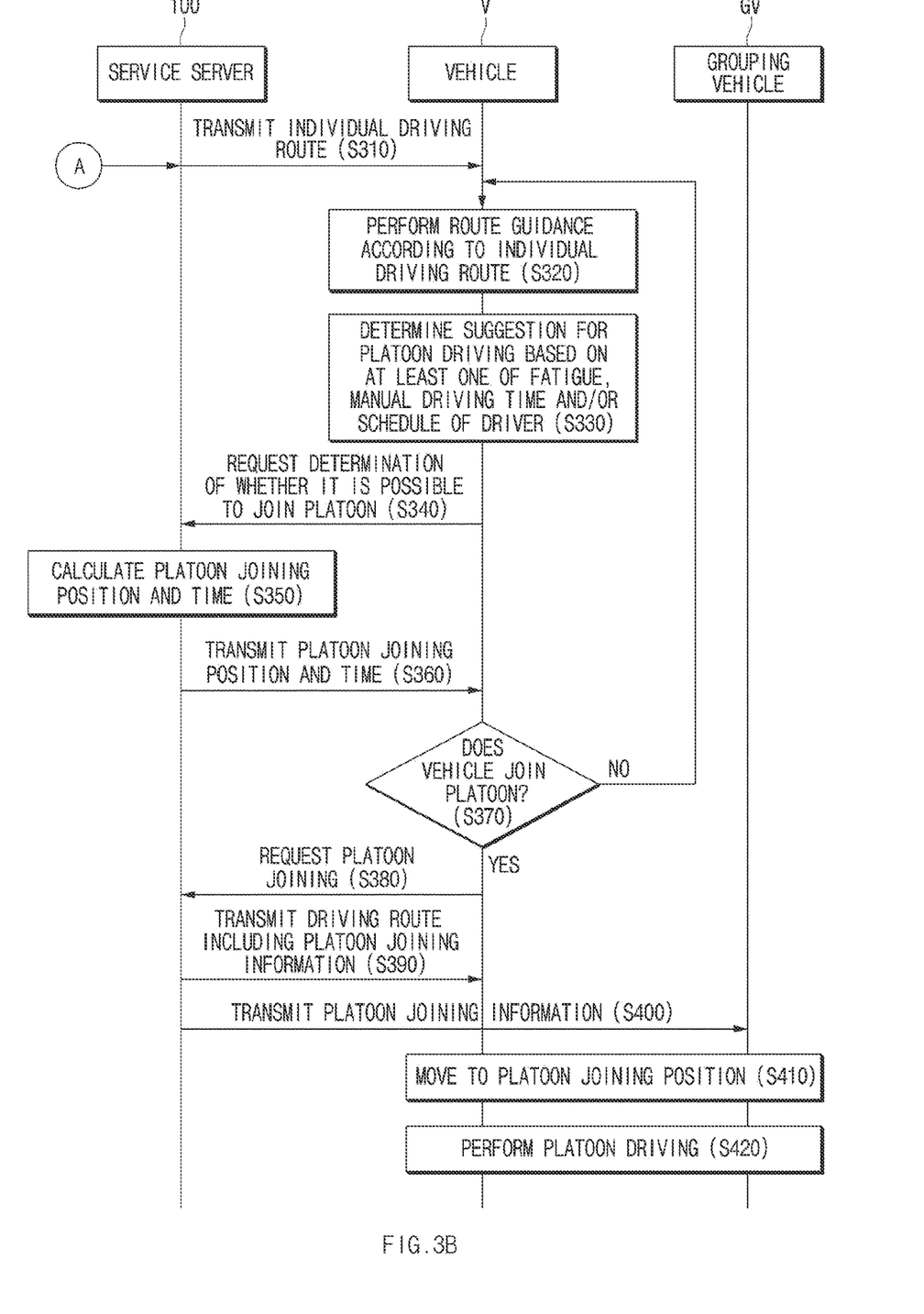
Figure 4:
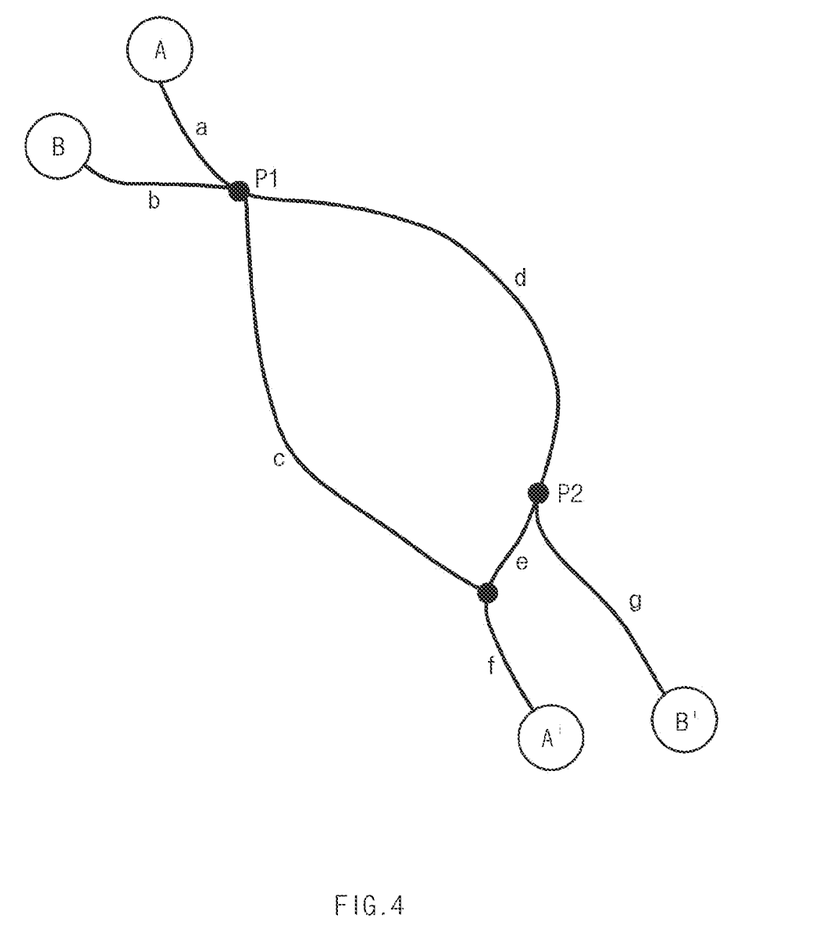
FIG. 4 is a diagram for describing generation of a route according to an exemplary embodiment the present disclosure.

FIGS. 3A and 3B are flowcharts of a route search method of a navigation system according to an exemplary embodiment of the present disclosure, and FIG. 4 is a diagram for describing generation of a route according to the present disclosure. Referring to FIG. 3A, the vehicle "V" may be configured to transmit a route search request to the service server 100 (S110). The processor 380 of the vehicle "V" may be configured to transmit both current position information of the vehicle "V" measured by the positioning device 330 and preset destination information when the route search is requested. In this case, the vehicle "V" may also be configured to transmit a desired destination arrival time.

The service server 100 may be configured to generate an individual driving route based on the current position and destination information of the vehicle "V" (S120). Particularly, the processor 130 of the service server 100 may be configured to generate the individual driving route based on traffic information. For example, when the vehicle "V" intends to drive from location "A" to location "A" as illustrated in FIG. 4, the service server 100 may be configured to generate a first individual driving route (a→c→f) and a second individual driving route (a→d→e→f) in response to the route search request from the vehicle "V".

The service server 100 may be configured to search for a platoon driving global route which at least partially matches the individual driving route (S130). For example, when a platoon driving global route (b→d→g) for driving from location B to location B' as illustrated in FIG. 4 is stored in the database DB, the service server 100 may be configured to search the database DB for the corresponding platoon driving global route since a section "d" in the platoon driving global route matches a section "d" in the second individual driving route.

When the platoon driving global route is detected, the service server 100 may be configured to calculate a platoon joining position and a platoon joining time based on the individual driving route (e.g., the second individual driving route) and the platoon driving global route, which match each other in a particular section. Referring to FIG. 4, the service server 100 may be configured to calculate a location P1 at which the second individual driving route meets the platoon driving global route, as the platoon joining position.

The service server 100 may be configured to transmit information regarding the calculated platoon joining position and time to the vehicle "V" (S150). In response to receiving the information regarding the platoon joining position and time, the vehicle "V" may be configured to determine whether to join a platoon based on the information regarding the platoon joining position and time. The processor 380 of the vehicle "V" may be configured to map the platoon joining position onto map information and display the same (e.g., on a display within the vehicle). The processor 380 of the vehicle "V" may also be configured to output a time (e.g., a waiting time) necessary to wait at the platoon joining position to participate in platoon driving. A user (e.g., driver) may identify the platoon joining position and time and then determine whether to participate in platoon driving. The vehicle "V" may be configured to determine whether to join the platoon by reflecting the user's intention to participate in platoon driving. In response to determining to join the platoon (e.g., based on user input), the vehicle "V" may be configured to transmit a platoon joining request to the service server 100 (S170). In particular, the vehicle "V" may be configured to transmit vehicle identification information together with the platoon joining request.

The service server 100 may be configured to generate driving route information including the platoon joining information (e.g., the platoon joining position and time) by mixing or combining the individual driving route and the platoon driving global route according to the platoon joining request of the vehicle "V" and transmit the generated driving route information to the vehicle "V". In particular, the service server 100 may be configured to generate a platoon exit information (e.g., platoon exit position and time). For example, the service server 100 may be configured to generate a driving route (a→d→e→f), the platoon joining information (platoon joining position P1 and time), and the platoon leaving information (platoon exit position P2 and time), based on the second individual driving route (a→d→e→f) and the platoon driving global route (b→d→g).

The service server 100 may then be configured to transmit the platoon joining information to the grouping vehicles GV (S190). The vehicle "V" and the grouping vehicles GV may move to the platoon joining position based on the platoon joining information. The grouping vehicles GV may move to the platoon joining position and determine a position of the vehicle "V" in a row of vehicles in the platoon, or the like. The vehicle "V" and the grouping vehicles GV may be configured to execute platoon driving after arriving at the platoon joining position (S210). In particular, the vehicle "V" may be configured to (e.g., may be operated to) join the platoon to which the grouping vehicles GV belong according to a predetermined procedure, follow a preceding vehicle of the platoon which the vehicle "V" joins, and execute autonomous driving.

Thereafter, when the vehicle "V" arrives at the platoon leaving position, the vehicle "V" may be configured to stop the platoon driving and perform the individual driving. For example, in response to receiving the driving route (a→d→e→f) including the section route "d" in which platoon driving is possible, the vehicle "V" may be configured to drive individually in a section "a" and move to the platoon joining position P1. Then, the vehicle "V" may be configured to join the platoon and execute platoon driving in the section "d" together with the grouping vehicles GV. In response to arriving at the platoon leaving position P2, the vehicle "V" may be configured to stop the platoon driving and execute the individual driving in sections "e" and "f" (see FIG. 4).

Referring to FIG. 3B, when a platoon driving global route that at least partially matches the individual driving route is not detected in S130 and the vehicle "V" may be configured to determine not to join the platoon in S160, the service server 100 may be configured to transmit the individual driving route generated in S120 to the vehicle "V" (S310). The vehicle "V" may be configured to map the individual driving route onto the map information and then execute route guidance (S320). The driver may operate the vehicle based on the route guidance.

The vehicle "V" may be configured to determine whether to suggest platoon driving based on at least one of the fatigue, the manual driving time, and schedule of the driver during the individual driving (S330). The processor 380 of the vehicle terminal apparatus 300 mounted within the vehicle "V" may be configured to obtain and collect driver information such as the driver's fatigue degree, manual driving time, schedule or the like using the detector 320 while the vehicle "V" performs individual driving. The processor 380 may be configured to determine the driver's fatigue degree based on the biometric information of the driver measured by the biometric signal measuring device and identify a schedule from the driver's electronic device (e.g., smartphone and/or tablet) through the communicator 310. Further, the processor 380 may be configured to calculate a time during which the driver directly drives the vehicle "V", that is, a driver manual driving time, based on vehicle driving history. The processor 380 may be configured to determine a suggestion for platoon driving to the driver when the driver's fatigue degree is out of a reference range, the driver manual driving time exceeds a reference time, or there is a schedule to be processed during driving of the vehicle. The driver's fatigue degree can be quantitatively analyzed by measuring a weight distribution according to driver's posture change using a weight sensor built in a seat. The processor 380 may be configured to determine a suggestion for platoon driving to the driver when the measured weight distribution exceeds a pre-defined reference value. The reference range is determined by a system designer based on experimental data of the driver's fatigue. For example, the schedule may include a meeting or other similar event that the driver may attend to during platoon driving.

The method described herein below may be executed by a controller mounted within the vehicle. In particular, the vehicle "V" may be configured to request the service server 100 to determine whether it is possible to join a platoon when the suggestion for platoon driving is determined (S340). The vehicle "V" may be configured to provide information regarding a current position of the vehicle "V" to the service server 100 when requesting the determination whether it is possible to join a platoon. The service server 100 may then be configured to determine whether it is possible to join a platoon based on the request of the vehicle "V" and calculate a platoon joining position and a platoon joining time (S350). The service server 100 may be configured to determine whether there is a platoon which the vehicle "V" is able to join based on the current position of the vehicle "V" (e.g., a platoon is located in a nearby location to the vehicle's position). When there is the platoon which the vehicle "V" is able to join, the service server 100 may be configured to calculate a platoon joining position and a platoon joining time based on the platoon driving global route of the corresponding platoon and the current position and individual driving route of the vehicle "V".

Further, the service server 100 may be configured to transmit information regarding the platoon joining position and time to the vehicle "V" (S360). In response to receiving the information regarding the platoon joining position and time, the vehicle "V" may be configured to determine whether to join the platoon (S370). In other words, the vehicle "V" may be configured to inform the driver of the information regarding the platoon joining position and time and determine whether to join the platoon based on the driver's intention to participate in platoon driving. In response to determining to join the platoon, the vehicle "V" may be configured to transmit a platoon joining request to the service server 100 (S380).

The service server 100 may be configured to generate a driving route including platoon joining information and transmit the driving route to the vehicle "V" based on a platoon joining request of the vehicle "V" (S390). The service server 100 may then be configured to generate the platoon joining information based on the platoon driving global route detected based on the current position of the vehicle "V". The service server 100 may be configured to transmit the platoon joining information to the grouping vehicles GV when transmitting the driving route to the vehicle "V" (S400). The vehicle "V" and the grouping vehicles GV may then move to the platoon joining position included in the platoon joining information (S410). The vehicle "V" and the grouping vehicles GV may be configured to execute platoon driving when the platoon joining position (S420) I reached. On the other hand, when the vehicle "V" determines not to join the platoon, that is, determines individual driving in S370, the vehicle "V" may return to S320 and maintain route guidance based on the individual driving route.

Figure 5:
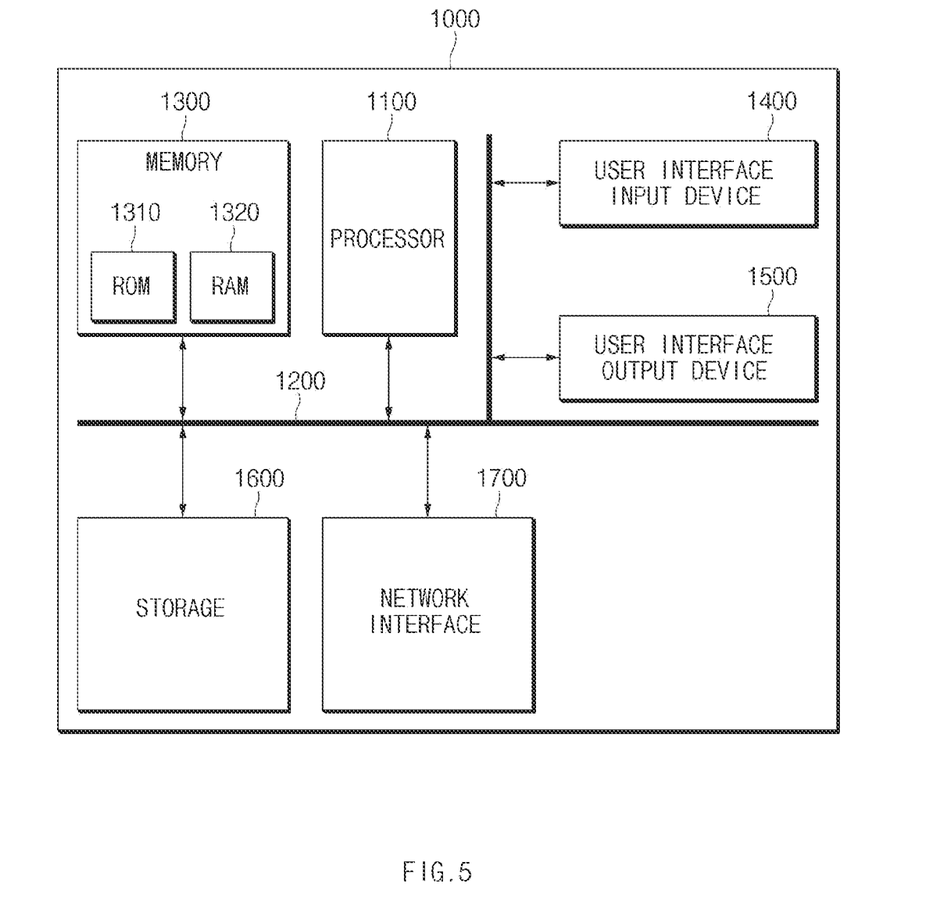
FIG. 5 is a block diagram of a computing system for executing a route search method according to an exemplary embodiment of the present disclosure.

FIG. 5 is a block diagram of a computing system for executing a route search method according to an exemplary embodiment of the present disclosure. Referring to FIG. 5, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory). Thus, the operations of the method or the algorithm described in connection with the embodiments disclosed herein may be embodied directly in hardware or a software module executed by the processor 1100, or in a combination thereof.

The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to the present disclosure, it may be possible to provide an optimal driving route in which individual driving and platoon driving are possible based on real-time traffic situations and platoon driving information. Therefore, a driver may take a rest or process a specific schedule while the vehicle performs platoon driving (e.g., the driver may not be required to manually operate the vehicle). The effects of the present disclosure are not limited to the effects described above, and other effects not described may be clearly understood by those skilled in the art from the description of the claims.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A vehicle terminal apparatus, comprising:
 a communicator including a transceiver configured to perform communication with a service server and a grouping vehicle;
 a vehicle controller configured to operate a vehicle; and
 a processor configured to:
  receive a driving route in which individual driving and platoon driving are possible by requesting a route search from the service server, and
 transmit a signal to the vehicle controller to execute platoon driving when the vehicle arrives at a platoon driving section in the driving route,
 wherein the processor is further configured to:
  determine fatigue degree of a driver based on biometric information of the driver measured by a biometric signal measuring device, and
  determine whether to suggest the platoon driving to a driver based on whether the fatigue degree of the driver is out of a reference range.

2. The vehicle terminal apparatus of claim 1, wherein the processor is further configured to determine whether to suggest the platoon driving to a driver based on at least one of a manual driving time and a schedule of the driver using sensors mounted within the vehicle while the vehicle is being driven.

3. The vehicle terminal apparatus of claim 2, wherein the processor is configured to request the service server to determine whether it is possible to join a platoon based on a current position of the vehicle when it is determined to suggest the platoon driving.

4. The vehicle terminal apparatus of claim 1, further comprising:
 a user input device configured to receive a user input,
 wherein the processor is configured to stop the platoon driving and execute route guidance for the individual driving in response receiving a platoon exit command from the user input device during the platoon driving.

* * * * *